US010454964B2

(12) United States Patent
Deori et al.

(10) Patent No.: US 10,454,964 B2
(45) Date of Patent: Oct. 22, 2019

(54) SYSTEMS AND METHODS FOR DATA VISUALIZATION

(71) Applicant: Symantec Corporation, Mountain View, CA (US)

(72) Inventors: Deepti Sawant Deori, Mumbai (IN); Nisha Mistry, Pune (IN)

(73) Assignee: Symantec Corporation, Mountain View, CA (US)

( * ) Notice: Subject to any disclaimer, the term of this patent is extended or adjusted under 35 U.S.C. 154(b) by 266 days.

(21) Appl. No.: 15/231,732

(22) Filed: Aug. 8, 2016

(65) Prior Publication Data

US 2017/0374095 A1     Dec. 28, 2017

(51) Int. Cl.
*G06F 12/14*     (2006.01)
*H04L 29/06*     (2006.01)
*G06F 16/28*     (2019.01)
*G06F 16/9535*   (2019.01)
*G06F 3/0484*    (2013.01)

(52) U.S. Cl.
CPC ...... *H04L 63/1433* (2013.01); *G06F 3/04847* (2013.01); *G06F 16/285* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 9,021,397 B2* | 4/2015 | Ramsay | G06T 11/00 715/762 |
| D803,247 S | 11/2017 | Mistry et al. | |
| 9,940,739 B2* | 4/2018 | Bynoe | G06T 11/206 |
| 2007/0188494 A1* | 8/2007 | Agutter | G06F 17/30554 345/440 |
| 2015/0356160 A1* | 12/2015 | Berwick | G06F 17/30572 715/781 |

OTHER PUBLICATIONS

Deepti Sawant Deori; Display Screen with Graphical User Interface; U.S. Appl. No. 29/569,716, filed Jun. 29, 2016.
(Continued)

*Primary Examiner* — Brandon S Hoffman
(74) *Attorney, Agent, or Firm* — FisherBroyles, LLP

(57) ABSTRACT

The disclosed computer-implemented method for data visualization may include (i) identifying a data set that includes data entities and relationships between the data entities, (ii) dividing the data entities into groups, (iii) responding to a request to display the data set within a graphical user interface by portraying the data set as concentric rings, each given ring portraying a corresponding group and portraying data entities within the corresponding group as arcs of the given ring, (iv) receiving an input within the graphical user interface to select a data entity within a group by selecting an arc corresponding to the selected data entity of a ring corresponding to the group, and (v) determining that a subset of data entities within an additional group are related to the selected data entity and highlighting the subset of data entities within an additional ring. Various other methods, systems, and computer-readable media are also disclosed.

19 Claims, 10 Drawing Sheets

(56) References Cited

OTHER PUBLICATIONS

Big Data Visualizations: A Good Use of the Chord; https://web.archive.org/web/20150114081210/http://kromerbigdata.com/2013/11/25/big-data-visualizations-a-good-use-of-the-chord/comment-page-1/; as accessed on Jun. 15, 2016.
5 Absolutely Stunning Big-Data Visualizations; http://www.customerintelligence360.com/5-absolutely-stunning-big-data-visualizations/; as accessed on Jun. 15, 2016.
Biggs-Smith Graph; https://en.wikipedia.org/wiki/Biggs%E2%80%93Smith_graph; as accessed on Jun. 15, 2016.
Cybermap; https://cybermap.kaspersky.com; as accessed on Jun. 15, 2016.
Spotlight: Threat Visualizations; http://www.softwareadvice.com/security/spotlight/threat-visualizations-2014/; as accessed on Jun. 15, 2016.
Visualizing OSX Threat Internet Distribution; http://secviz.org/content/visualizing-os-x-threat-internet-distribution; as accessed on Jun. 15, 2016.
Application Usage & Threat Report; http://researchcenter.paloaltonetworks.com/app-usage-risk-report-visualization/#; as accessed on Jun. 15, 2016.
Draw Deeper Insights; https://quid.com/; as accessed on Jun. 15, 2016.
Enterprise Trend Visualization and the Potential of OSINT; http://blogs.csc.com/2015/02/17/enterprise-trend/visualization-and-the-potential-of-osint/; as accessed on Jun. 15, 2016; Feb. 17, 2015.
Understanding Link Analysis From the Analytic Workshop; http://linkanalysisnow.com/2011/07/using-visual-analysis-for-network.html; as accessed on Jun. 15, 2016.
Pravail; https://www.pravail.com/; as accessed on Jun. 15, 2016.
6 ways big data is helping reinvent enterprise security; https://gigaom.com/2012/11/15/6-ways-big-data-is-helping-reinvent-enterprise-security/; as accessed on Jun. 15, 2016.
Multi-Touch Visualization Reveals the Max Planck Research Network; http://infosthetics.com/archives/2011/09/multi-touch_visualization_reveals_max_planck_research_networks.html; as accessed on Jun. 15, 2016; Sep. 12, 2011.
Max Planck Research Networks; http://max-planck-research-networks.net/; as accessed on Jun. 15, 2016.
Using NVivo: An Unofficial and Unauthorized Primer; http://scalar.usc.edu/works/using-nvivo-an-unofficial-and-unauthorized-primer/types-of-data-visualizations-in-nvivo; as accessed on Jun. 15, 2016.
Bottlenose; https://bottlenose.com/products; as accessed on Jun. 15, 2016.
Ch. 11: Information Visualization for Text Analysis; http://searchuserinterfaces.com/book/sui_ch11_text_analysis_visualization.html; as accessed on Jun. 15, 2016.
Visualization—Big Data—Analytics—BlackHat US Workshop; http://raffy.ch/blog/category/log-analysis/; as accessed on Jun. 15, 2016.
Visualization of the Week: Clustering your social graph; http://radar.oreilly.com/2012/04/facebook-visualization-app-friends-experiences.html; as accessed on Jun. 15, 2016; Apr. 6, 2012.
Visualize your LinkedIn network with InMaps; https://blog.linkedin.com/2011/01/24/linkedin-inmaps; as accessed on Jun. 15, 2016; Jan. 24, 2011.
Why Visualization Matters in CRM; http://blog.pipelinersales.com/sales-effectiveness/why-visualization-matters-in-crm/; as accessed on Jun. 15, 2016; Jan. 26, 2015.
Capano et al.; Techniques for Presenting Information on a Graphical User Interface; U.S. Appl. No. 14/219,573, filed Mar. 19, 2014.
Capano et al.; Techniques for Presenting Information on a Graphical User Interface; U.S. Appl. No. 14/219,584, filed Mar. 19, 2014.
Capano et al.; Transitional Graphical User Interface for a Display Screen or a Portion Thereof; U.S. Appl. No. 29/485,487, filed Mar. 19, 2014.
Timothy Holl et al.; Systems and Methods for Providing Interfaces for Visualizing Threats Within Networked Control Systems; U.S. Appl. No. 15/368,542, filed Dec. 2, 2016.
NexDefense; http://www.nexdefense.com/, as retrieved on Dec. 7, 2016.
Darktrace; http://www.darktrace.com/, as retrieved on Dec. 7, 2016.
CyberX; http://cyberx-labs.com/en/home/, as retrieved on Dec. 7, 2016.
Timothy Holl; Display Screen With Graphical User Interface; U.S. Appl. No. 29/586,413, filed Dec. 2, 2016.

* cited by examiner

United States Patent US 10,454,964 B2

SYSTEMS AND METHODS FOR DATA VISUALIZATION

BACKGROUND

In the digital age, organizations produce, collect, and store increasingly large volumes of data. "Business Intelligence" is a term often used to refer to technologies that leverage raw data to derive information that is useful to an organization in identifying patterns, summarizing trends, and/or making decisions.

Unfortunately, traditional Business Intelligence technologies may fail to provide a meaningful, holistic picture of the relevant data. Administrators or other users of traditional Business Intelligence technologies may spend the majority of their time browsing data lists, zooming in and out of data views, and attempting to decipher presentations. Compounding the problem, in the process users may lose track of their browsing locations and/or their findings as they browse. As data sets grow, the difficulty of quickly and reliably navigating and interpreting the data sets increase further.

In some cases, data analysis tasks may be time-sensitive. For example, computing security administrators may need to quickly and comprehensively digest data in order to quickly address potential computing security concerns. Accordingly, the instant disclosure identifies and addresses a need for additional and improved systems and methods for data visualization.

SUMMARY

As will be described in greater detail below, the instant disclosure describes various systems and methods for data visualization by providing a graphical user interface that presents data entities as arcs of concentric rings, where selecting a data entity within one ring causes data entities in one or more additional rings (e.g., adjacent rings) to highlight related and/or correlated data entities.

In one example, a computer-implemented method for data visualization may include (i) identifying a data set that includes a group of data entities and a group of relationships between the data entities, (ii) dividing the data entities into a group of groups, (iii) responding to a request to display a representation of the data set within a graphical user interface by portraying the data set as a group of concentric rings, each given ring within the concentric rings portraying a corresponding group within the groups and portraying at least one data entity within the corresponding group as an arc of the given ring, (iv) receiving an input within the graphical user interface to select a data entity within a selected group of the groups by selecting an arc corresponding to the selected data entity of a ring corresponding to the selected group, and (v) in response to the input, (A) determining that a subset of data entities within an additional group of the groups are related to the selected data entity and (B) highlighting, within the graphical user interface, the subset of data entities within an additional ring that corresponds to the additional group.

In some examples, determining that the subset of entities within the additional group of the groups are related to the selected entity may include determining that the subset of data entities are related to the selected data entity in response to determining that the additional ring is adjacent to the ring corresponding to the selected group.

In some examples, determining that the additional ring is adjacent to the ring corresponding to the selected group may include (i) determining that the additional ring is adjacent and exterior to the ring corresponding to the selected group and/or (ii) determining that the additional ring is adjacent and interior to the ring corresponding to the selected group.

In one embodiment, the computer-implemented method may further include (i) determining that a third subset of data entities within a third group of the groups are related to the subset of data entities within the additional group and (ii) highlighting, within the graphical user interface, the third subset of data entities within a third ring that corresponds to the third group.

In some examples, portraying the data set as a group of concentric rings may include portraying a group of data entities within the corresponding group as a group of segmented arcs of the given ring.

In some examples, portraying the data set as a group of concentric rings may include (i) determining a number of designated data entities to represent within a designated ring of the concentric rings, (ii) determining that the number of designated data entities exceeds a predetermined threshold, and (iii) displaying the designated data entities as a solid arc of the designated ring rather than as a group of segmented arcs based on determining that the number of designated data entities exceeds the predetermined threshold.

In some examples, portraying the data entities as a group of segmented arcs of the given ring may include portraying the data entities as a group of segmented arcs of a consistent size.

In some examples, the computer-implemented method may further include restricting which data entities within the data entities are portrayed within the concentric rings based on at least one filter that excludes one or more of the data entities.

In one embodiment, the concentric rings may include (i) a first ring portraying a group of computing security threats, (ii) a second ring, adjacent to the first ring, portraying a group of computing security vulnerabilities, wherein the data set indicates which of the computing security threats exploit which of the computing security vulnerabilities, (iii) a third ring, adjacent to the second ring, portraying a group of software, wherein the data set indicates which of the computing security vulnerabilities are present in which of the software, and (iv) a fourth ring, adjacent to the third ring, portraying a group of software instances, where the data set indicates which of the software are instantiated by which of the software instances.

In one embodiment, the concentric rings may include (i) a first ring portraying a first plurality of users of a social network and (ii) a second ring portraying a second plurality of users of the social network, where the data set indicates which of the first plurality of users of the social network are connected on the social network to which of the second plurality of users of the social network.

In one embodiment, the computer-implemented method may further include receiving an activating input within the graphical user interface relating to the selected data entity and performing a security action on the selected data entity in response to the activating input.

In one embodiment, a system for implementing the above-described method may include (i) an identification module, stored in memory, that identifies a data set that includes a group of data entities and a group of relationships between the data entities, (ii) a division module, stored in memory, that divides the data entities into a group of groups, (iii) a responding module, stored in memory, that responds to a request to display a representation of the data set within a graphical user interface by portraying the data set as a group of concentric rings, each given ring within the concentric rings portraying a corresponding group within the groups and portraying at least one data entity within the corresponding group as an arc of the given ring, (iv) a receiving module, stored in memory, that receives an input within the graphical user interface to select a data entity within a selected group of the groups by selecting an arc corresponding to the selected data entity of a ring corresponding to the selected group, (v) a highlighting module, stored in memory, that, in response to the input, (A) determines that a subset of data entities within an additional group of the groups are related to the selected data entity and (B) highlights, within the graphical user interface, the subset of data entities within an additional ring that corresponds to the additional group, and (vi) at least one physical processor configured to execute the identification module, the division module, the responding module, the receiving module, and the highlighting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a data set that includes a group of data entities and a group of relationships between the data entities, (ii) divide the data entities into a group of groups, (iii) respond to a request to display a representation of the data set within a graphical user interface by portraying the data set as a group of concentric rings, each given ring within the concentric rings portraying a corresponding group within the groups and portraying at least one data entity within the corresponding group as an arc of the given ring, (iv) receive an input within the graphical user interface to select a data entity within a selected group of the groups by selecting an arc corresponding to the selected data entity of a ring corresponding to the selected group, and (v) in response to the input, (A) determine that a subset of data entities within an additional group of the groups are related to the selected data entity and (B) highlight, within the graphical user interface, the subset of data entities within an additional ring that corresponds to the additional group.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
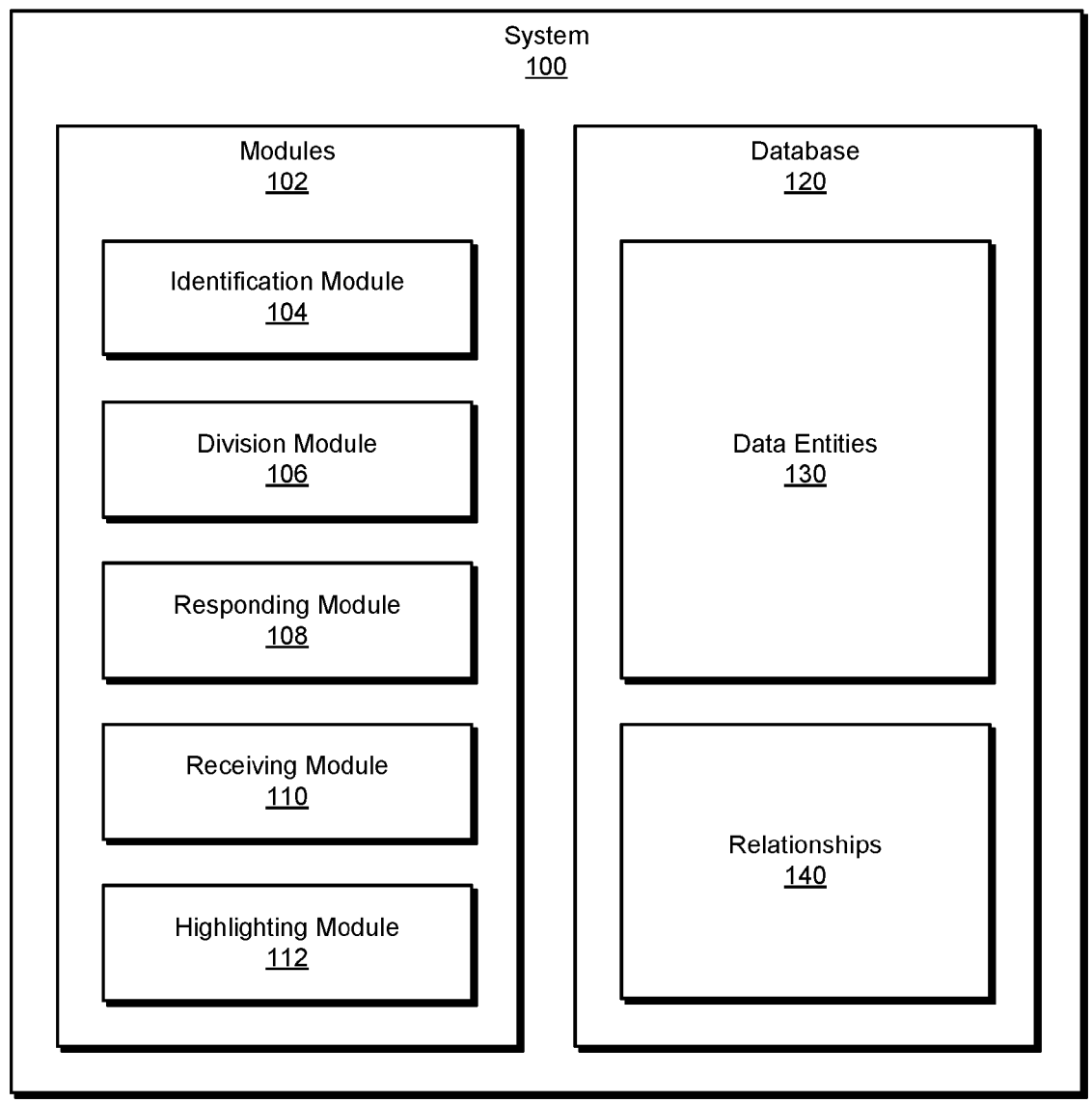
FIG. 1 is a block diagram of an example system for data visualization.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for data visualization. As will be explained in greater detail below, by providing a graphical user interface that presents data entities as arcs of concentric rings, where selecting a data entity within one ring causes data entities in one or more additional rings (e.g., adjacent rings) to highlight related and/or correlated data entities, the systems and methods described herein may provide a more holistic representation of relevant information while enabling a user to quickly and intuitively identify correlated data. In some examples, these systems and methods may enable security administrators to efficiently and effectively examine relationships between threats and vulnerabilities and associated software and instances, and thereby facilitate quick action on security threats.

Figure 2:
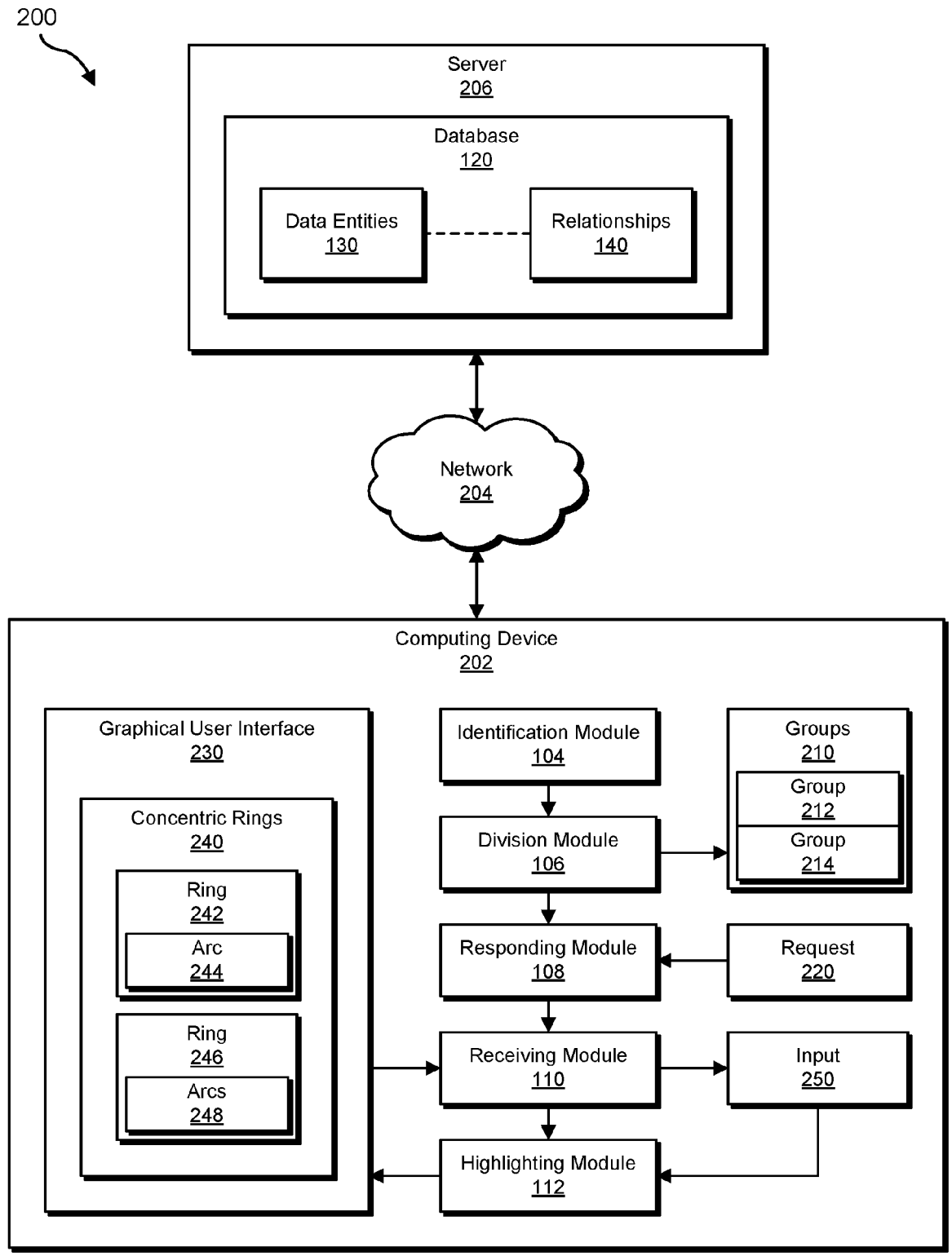
FIG. 2 is a block diagram of an additional example system for data visualization.

The following will provide, with reference to FIGS. 1-2, detailed descriptions of example systems for data visualization. Detailed descriptions of corresponding computer-implemented methods will also be provided in connection with FIG. 3. Detailed descriptions of illustrative graphical user interfaces will be provided in connection with FIG. 4-8. In addition, detailed descriptions of an example computing system and network architecture capable of implementing one or more of the embodiments described herein will be provided in connection with FIGS. 9 and 10, respectively.

FIG. 1 is a block diagram of example system 100 for data visualization. As illustrated in this figure, example system 100 may include one or more modules 102 for performing one or more tasks. For example, and as will be explained in greater detail below, example system 100 may include an identification module 104 that identifies a data set that includes a plurality of data entities and a plurality of relationships between the data entities. Example system 100 may additionally include a division module 106 that divides the plurality of data entities into a plurality of groups. Example system 100 may also include a responding module 108 that responds to a request to display a representation of the data set within a graphical user interface by portraying the data set as a plurality of concentric rings, each given ring within the plurality of concentric rings portraying a corresponding group within the plurality of groups and portraying at least one data entity within the corresponding group as an arc of the given ring. Example system 100 may additionally include a receiving module 110 that receives an input within the graphical user interface to select a data entity within a selected group of the plurality of groups by selecting an arc corresponding to the selected data entity of a ring corresponding to the selected group. Example system 100 may also include a highlighting module 112 that, in response to the input, (i) determines that a subset of data entities within an additional group of the plurality of groups are related to the selected data entity and (ii) highlights, within the graphical user interface, the subset of data entities within an additional ring that corresponds to the additional group. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 910 in FIG. 9, and/or portions of example network architecture 1000 in FIG. 10. One or more of modules 102 in FIG. 1 may also represent all or portions of one or more special-purpose computers configured to perform one or more tasks.

As illustrated in FIG. 1, example system 100 may also include one or more databases, such as database 120. In one example, database 120 may be configured to store one or more data entities, such as data entities 130, and one or more relationships between data entities, such as relationships 140.

Database 120 may represent portions of a single database or computing device or a plurality of databases or computing devices. For example, database 120 may represent a portion of server 206 in FIG. 2, computing system 910 in FIG. 9, and/or portions of example network architecture 1000 in FIG. 10. Alternatively, database 120 in FIG. 1 may represent one or more physically separate devices capable of being accessed by a computing device, such as server 206 in FIG. 2, computing system 910 in FIG. 9, and/or portions of example network architecture 1000 in FIG. 10.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to provide data visualization. For example, and as will be described in greater detail below, one or more of modules 102 may cause computing device 202 and/or server 206 to portray data entities 130 using concentric rings 240 in a graphical user interface 230 in a manner informed by relationships 140. For example, and as will be described in greater detail below, identification module 104 may identify data set 120 that includes data entities 130 and relationships 140 between data entities 130. Division module 106 may divide data entities 130 into groups 210. Responding module 108 may respond to a request 220 to display a representation of data set 120 within graphical user interface 230 by portraying data set 120 as concentric rings 240, each given ring within concentric rings 240 portraying a corresponding group within groups 210 and portraying at least one data entity within the corresponding group 212 as an arc of the given ring. Receiving module 110 may receive an input 250 within graphical user interface 230 to select a data entity within a selected group 212 of groups 210 by selecting an arc 244 corresponding to the selected data entity of a ring 242 corresponding to the selected group 212. Highlighting module 112 may determine, in response to input 250, that a subset of data entities within an additional group 214 of groups 210 are related to the selected data entity and highlight, within graphical user interface 230, the subset of data entities (e.g., as arcs 248) within an additional ring 246 that corresponds to group 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, example computing system 910 in FIG. 9, or any other suitable computing device.

Server 206 generally represents any type or form of computing device that is capable of storing and/or transmitting data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), example network architecture 1000 in FIG. 10, or the like. Network 204 may facilitate communication or data transfer using wireless or wired connections. In one embodiment, network 204 may facilitate communication between computing device 202 and server 206.

Figure 3:
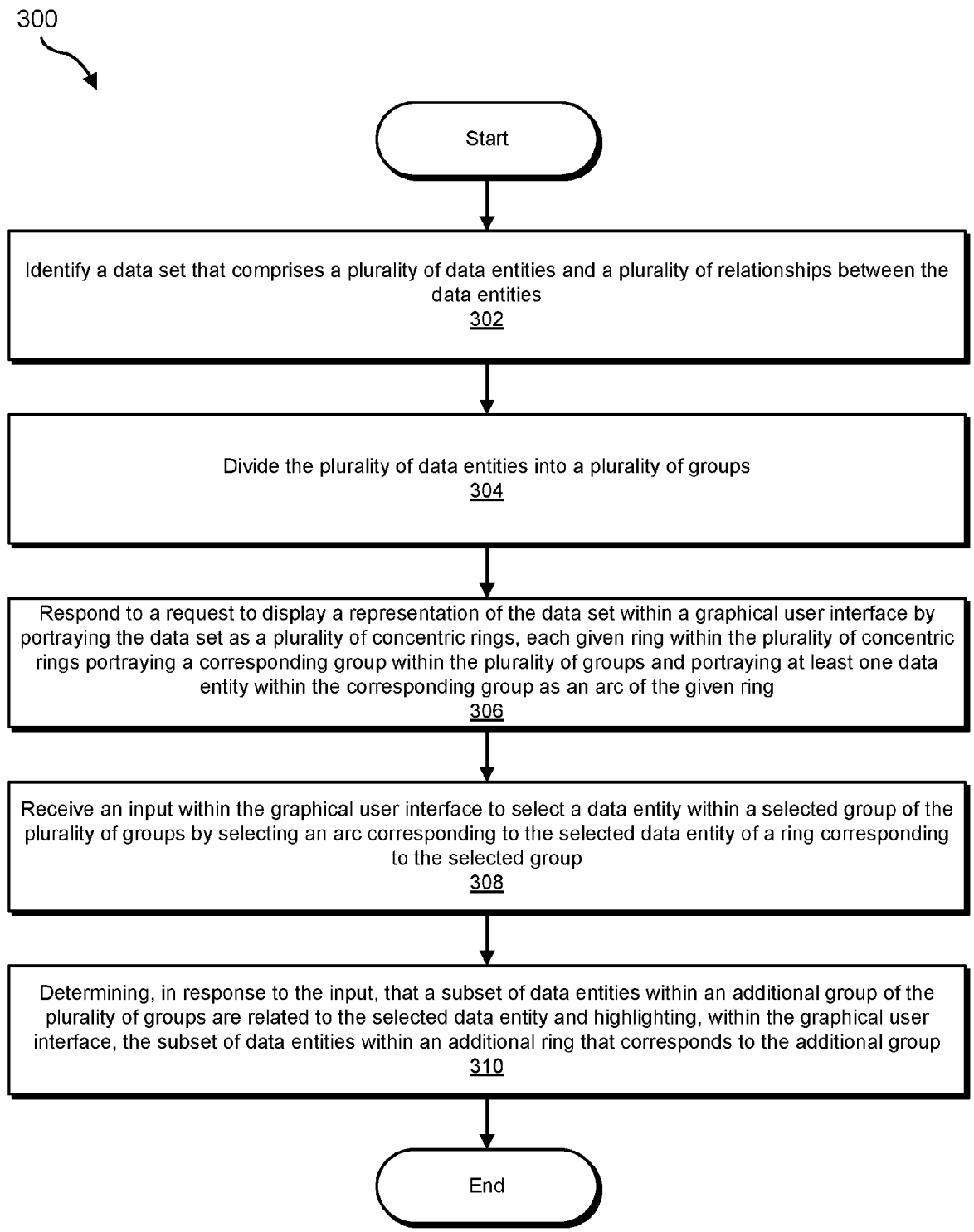
FIG. 3 is a flow diagram of an example method for data visualization.

FIG. 3 is a flow diagram of an example computer-implemented method 300 for data visualization. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 910 in FIG. 9, and/or portions of example network architecture 1000 in FIG. 10.

As illustrated in FIG. 3, at step 302, one or more of the systems described herein may identify a data set that may include a plurality of data entities and a plurality of relationships between the data entities. For example, identification module 104 may, as part of computing device 202 in FIG. 2, identify data set 120 that includes data entities 130 and relationships 140 between data entities 130.

The term "data set," as used herein, generally refers to any collection of data that may be subject to data analytics. In some examples, the data set may be collected from one or more data sources. The term "data entity," as used herein, generally refers to any discrete entity represented within a data set. The term "relationship," as used herein, generally refers to any connection, correspondence, relationship, and/or correlation between two data entities.

In some examples, the data set may relate to computing security, and the plurality of data entities may include one or more identified computing security threats, one or more computing vulnerabilities, one or more software products, and/or one or more software instances. In these examples, the relationships may describe which vulnerabilities are targeted by which threats, which software products possess which vulnerabilities, and which software instances correspond to which software products. As used herein, the term "software instance" may refer to instance and/or copy of a software product. In some examples, the term "software instance" may refer to an installation of a software product (e.g., such that multiple instances of a software product may represent multiple installations of a software product). Additionally or alternatively, the term "software instance" may refer to an execution of a software product in a computing environment (e.g., such that multiple instances of a software product may represent multiple executions of the software product in one or more computing environments). In some examples, the term "software instance" may refer to one or more computing resources allocated to execute an instance of a software product (e.g., within a cloud computing environment). For example, the term "software instance" may refer to a virtual machine (and/or computing resources underlying the virtual machine) provided within a cloud computing environment for executing a software product. Accordingly, in some examples, information identifying a software instance may identify a virtual machine within a cloud computing environment.

In some examples, the data set may relate to social networking, and the plurality of data entities may include social networking users. In these examples, the relationships may describe social networking connections between the social networking users. In some examples, the data set may relate to customer relationship management, and the plurality of data entities may include salespeople, target customers, and sales. In some examples, the data set may relate to law enforcement, and the plurality of data entities may include law enforcement officers, cases, and suspects. Generally, the data set may include any correlated data entities and the connections between the correlated data entities.

Identification module 104 may identify the data set in any suitable context. For example, identification module 104 may identify a database that stores the data set. Additionally or alternatively, identification module 104 may compile the data set. For example, identification module 104 may identify data sources, retrieve raw data from the data sources, and normalize the raw data to populate the data set.

Identification module 104 may identify the data set in any suitable manner. For example, identification module 104 may identify a database specified in a configuration file. Additionally or alternatively, identification module 104 may identify an input (e.g., to a graphical user interface) specifying a data set to be portrayed in a graphical user interface.

Returning to FIG. 3, at step 304, one or more of the systems described herein may divide the plurality of data entities into a plurality of groups. For example, division module 106 may, as part of computing device 202 in FIG. 2, divide data entities 130 into groups 210.

The term "group," as used herein, generally refers to any sorting, grouping, and/or classification of data entities. In some examples, the systems described herein may group data entities according to types of the data entities. Additionally or alternatively, the systems described herein may group data entities according to characteristics of the data entities.

Division module 106 may divide the data entities into a plurality of groups in any of a variety of ways. For example, division module 106 may divide the data entities into groups based on types corresponding to the data entities. Additionally or alternatively, division module 106 may divide the data entities into groups based on one or more attributes that describe and/or are assigned to the data entities. In some examples, division module 106 may determine a scheme by which the data entities are to be divided based on a user-specified configuration (e.g., input via a graphical user interface). In some examples, division module 106 may divide the data entities into groups based on the respective data sources from which the data entities were collected. In some examples, division module 106 may adopt a predefined grouping scheme used to store and/or classify the data entities within the data set. Generally, as will be described in greater detail below, division module 106 may divide the data entities according to a scheme such that one or more data entities selected from one group may result in highlighting one or more related data entities from another group.

In one example, the data set may relate to computing security, and division module 106 may divide the data entities into identified computing security threats, computing vulnerabilities, software products, and/or software instances. In another example, the data set may relate to social networking, the data entities may include social networking users, and division module 106 may divide the data entities by the geographical locations of the social networking users.

Returning to FIG. 3, at step 306, one or more of the systems described herein may respond to a request to display a representation of the data set within a graphical user interface by portraying the data set as a plurality of concentric rings, each given ring within the plurality of concentric rings portraying a corresponding group within the plurality of groups and portraying at least one data entity within the corresponding group as an arc of the given ring. For example, responding module 108 may, as part of computing device 202 in FIG. 2, respond to request 220 to display a representation of data set 120 within graphical user interface 230 by portraying data set 120 as concentric rings 240, each given ring within concentric rings 240 portraying a corresponding group within groups 210 and portraying at least one data entity within the corresponding group 212 as an arc of the given ring.

The term "graphical user interface," as used herein, may refer to any interface providing visual elements that may allow a user to interact with a computing system. For example, the graphical user interface may include a front-end portion of an application and/or service. Additionally or alternatively, the graphical user interface may include a web interface to an application and/or service.

The term "ring," as used here, may refer to any circular, rounding, and/or enclosing graphical element. In some examples, the term "ring" may refer to a geometrically annular shape (and/or a graphical element approximating a geometrically annular shape) representing a figure bounded by two concentric circles. The term "concentric ring," as used herein, may refer to any ring sharing a center with another ring.

Responding module 108 may portray the data set as concentric rings in any suitable manner. For example, responding module 108 may portray each group of the data set as a distinct ring. In some examples, responding module 108 may portray each data entity within a group as an arc of the corresponding ring. As used herein, the term "arc" may refer to any contiguous segment of a ring. For example, the term "arc" may refer to a figure bounded by two concentric circles and by a circular sector of the greater of the two concentric circles. As will be explained in greater detail below, in some examples responding module 108 may portray each data entity in one or more of the rings as a discrete, segmented arc. In some examples, responding module 108 may portray a subset of data entities within a ring as a continuous, unbroken arc. Thus, in some examples, portraying the data set as a plurality of concentric rings may include portraying a plurality of data entities within the corresponding group as a plurality of segmented arcs of the given ring. Additionally, in some examples, responding module 108 may (i) determine a number of designated data entities to represent within a designated ring of the plurality of concentric rings, (ii) determine that the number of designated data entities exceeds a predetermined threshold (e.g., based on any of a number of factors including, without limitation, user input, the display size of the graphical user interface, the size of the designated ring, etc.), and (iii) display the designated data entities as a solid arc of the designated ring rather than as a plurality of segmented arcs based on determining that the number of designated data entities exceeds the predetermined threshold.

In some examples, wherein portraying the plurality of data entities as a plurality of segmented arcs of the given ring may include portraying the plurality of data entities as a plurality of segmented arcs of a consistent size. For example, responding module 108 may determine a number of segmented arcs to portray in a given ring and then calculate a consistent size for each of the segmented arcs such that the segmented arcs fill the ring.

In some examples, responding module 108 may render each ring in a different color, a different shade group, and/or different palette of colors. For example, responding module 108 may render one ring in red shades, one ring in yellow shades, one ring in green shades, and one ring in blue shades. In some examples, responding module 108 may use different shades of a color for different arcs in a ring to highlight entities. For example, responding module 108 may use a dark and/or saturated shade for a currently selected arc and/or for an arc that is currently used to filter for other data entities, an intermediate shade for data entities that meet filters imposed by related and/or selected data entities, and a light, pale, and/or faint shade for entities that neither are selected nor correlate with selected entities.

In some examples, as will be described in greater detail below, responding module 108 may receive an input to select a data entity (e.g., by receiving an input directed at a corresponding arc). Responding module 108 may receive the input in any of a variety of ways. For example, responding module 108 may receive input from a pointing device (e.g., a mouse click) directed at the corresponding arc, a tap on a touchscreen device directed at the corresponding arc, etc. In these examples, responding module 108 may update the graphical user interface to highlight one or more arcs representing related data entities, to provide detailed information relating to the selected data entity, and/or to provide an interface for taking an action relating to the selected data entity.

Responding module 108 place rings representing groups of data entities in any suitable manner. For example, the data set may relate data entities of one group to data entities of another group. Accordingly, responding module 108 may represent the two groups as adjacent rings. Furthermore, in some examples one group of data entities may be larger than another group of data entities. Accordingly, responding module 108 may place smaller groups as interior rings and larger groups as exterior rings (e.g., where the placement meets other constraints, including keeping related groups of data entities as adjacent rings). In one example, the plurality of concentric rings may include (i) a first ring portraying a plurality of computing security threats, (ii) a second ring, adjacent to the first ring, portraying a plurality of computing security vulnerabilities, wherein the data set indicates which of the plurality of computing security threats exploit which of the plurality of computing security vulnerabilities, (iii) a third ring, adjacent to the second ring, portraying a plurality of software, where the data set indicates which of the plurality of computing security vulnerabilities are present in which of the plurality of software, and (iv) a fourth ring, adjacent to the third ring, portraying a plurality of software instances, where the data set indicates which of the plurality of software are instantiated by which of the plurality of software instances. In another example, the plurality of concentric rings may include (i) a first ring portraying a first plurality of users of a social network and (ii) a second ring portraying a second plurality of users of the social network, wherein the data set indicates which of the first plurality of users of the social network are connected on the social network to which of the second plurality of users of the social network.

Figure 4:
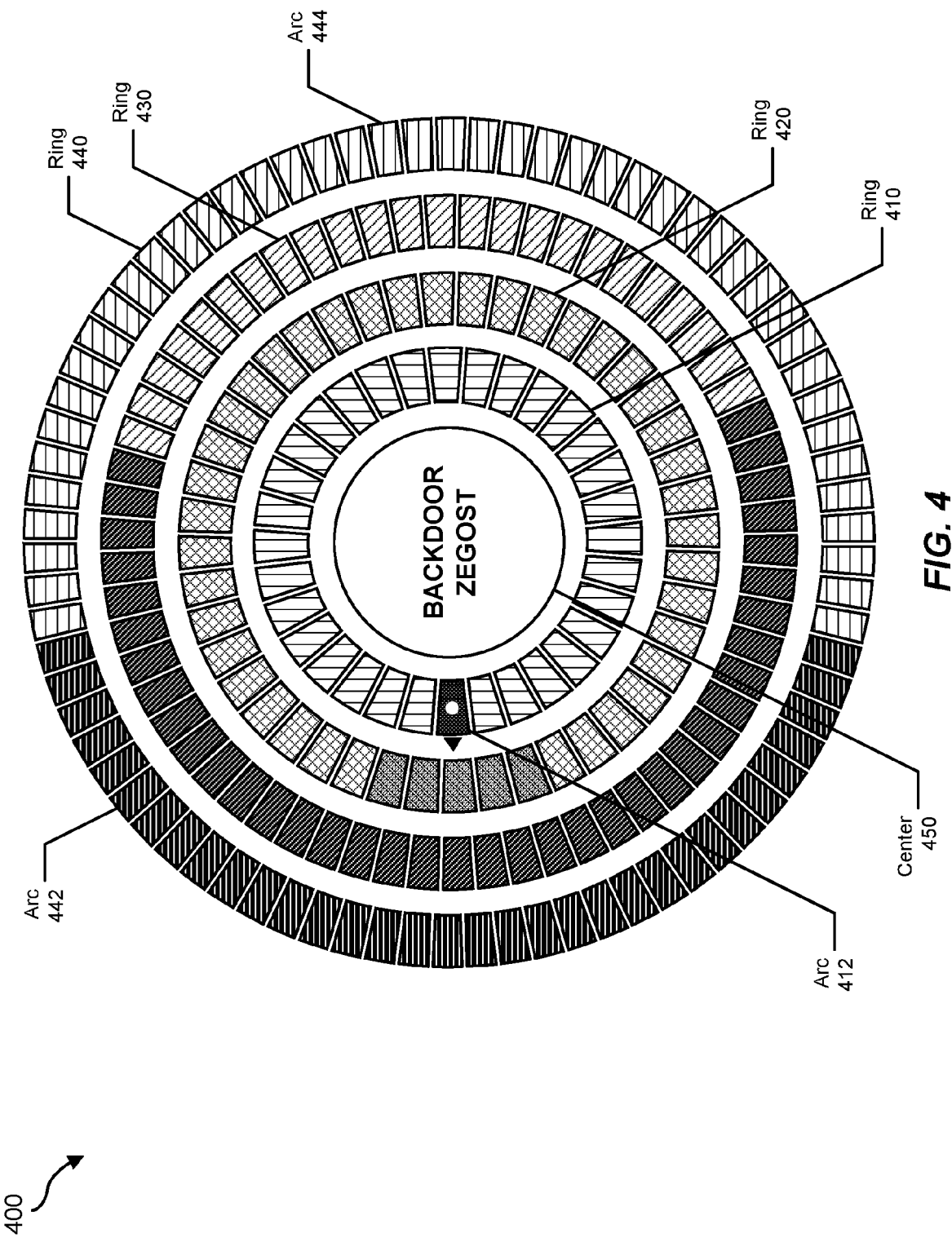
FIG. 4 is an illustration of an example graphical user interface for data visualization.

To provide an illustration of a graphical user interface for data visualization, FIG. 4 illustrates an example graphical user interface 400. As shown in FIG. 4, graphical user interface may include a ring 410, a ring 420, a ring 430, a ring 440, and a center 450. In one example, graphical user interface 400 may present a computing security data set via rings 410, 420, 430, and 440. For example, ring 410 may represent computing security threats (e.g., each segmented arc representing a distinct threat). Likewise, ring 420 may represent computing vulnerabilities, ring 430 may represent software products, and ring 440 may represent software instances. Thus, an arc 412 in ring 410 may represent a particular threat (e.g., "Backdoor Zegost"). In one example, arcs in ring 412 may be russet-toned. Arcs in ring 412 that are not selected may present with a light russet tone, while the selected arc 412 may present with a dark russet tone. Because arc 412 in ring 410 is selected, responding module 108 check the vulnerabilities represented by the adjacent ring 420 to see which vulnerabilities are related to the selected threat (e.g., which vulnerabilities are exploitable by the selected threat). Responding module 108 may, accordingly, highlight the related vulnerabilities in ring 420. For example, responding module 108 may portray vulnerabilities as chrome-yellow-toned arcs in ring 420. Five arcs in ring 420 representing five vulnerabilities related to the selected threat as five arcs may present with a medium chrome-yellow tone, while the remaining vulnerabilities in ring 420 may present with a light chrome-yellow tone. For example, "Backdoor Zegost" may exploit five vulnerabilities, including "CVE-2012-0507," "CVE-2015-5119," "CVE-2013-0640," "CVE-2012-0158," and "CVE-2010-333." For example, the vulnerability "CVE-2012-0507" may represent a vulnerability to an injection attack that installs a backdoor on target computing systems. Thus, the selection of "Backdoor Zegost" in ring 410 may highlight the corresponding vulnerabilities in the adjacent ring 420. Responding module 108 may, in turn, highlight software products in ring 430 related to the highlighted vulnerabilities in ring 420 (e.g. presenting software products that possess one or more of the highlighted vulnerabilities in a medium green color and presenting other software products in a light green color). For example, the software products possessing one or more of the highlighted vulnerabilities (e.g., "CVE-2012-0507," etc.) may include JAVA, ADOBE FLASH, MICROSOFT OFFICE, ADOBE READER, and/or various additional software products. Accordingly, the highlighted vulnerabilities in ring 420 may in turn lead to the highlighting of these software products in ring 430. Finally, responding module 108 may highlight software instances in ring 440 related to the highlighted software products in ring 430 (e.g., presenting software instances that are instances of the highlighted software products in a medium blue color and presenting other software instances in a light blue color). For example, the software instances may include instances of (and/or instances including) JAVA, ADOBE FLASH, MICROSOFT OFFICE, ADOBE READER, etc. For example, a cloud computing environment may host multiple instances of JAVA, of ADOBE FLASH, of MICROSOFT OFFICE, and/or of ADOBE READER for a cloud computing customer who may use the systems and methods described herein to monitor the security status of their cloud computing instances. Accordingly, the highlighted software products in ring 430 may in turn lead to the highlighting of their corresponding instances in ring 440.

Figure 5:
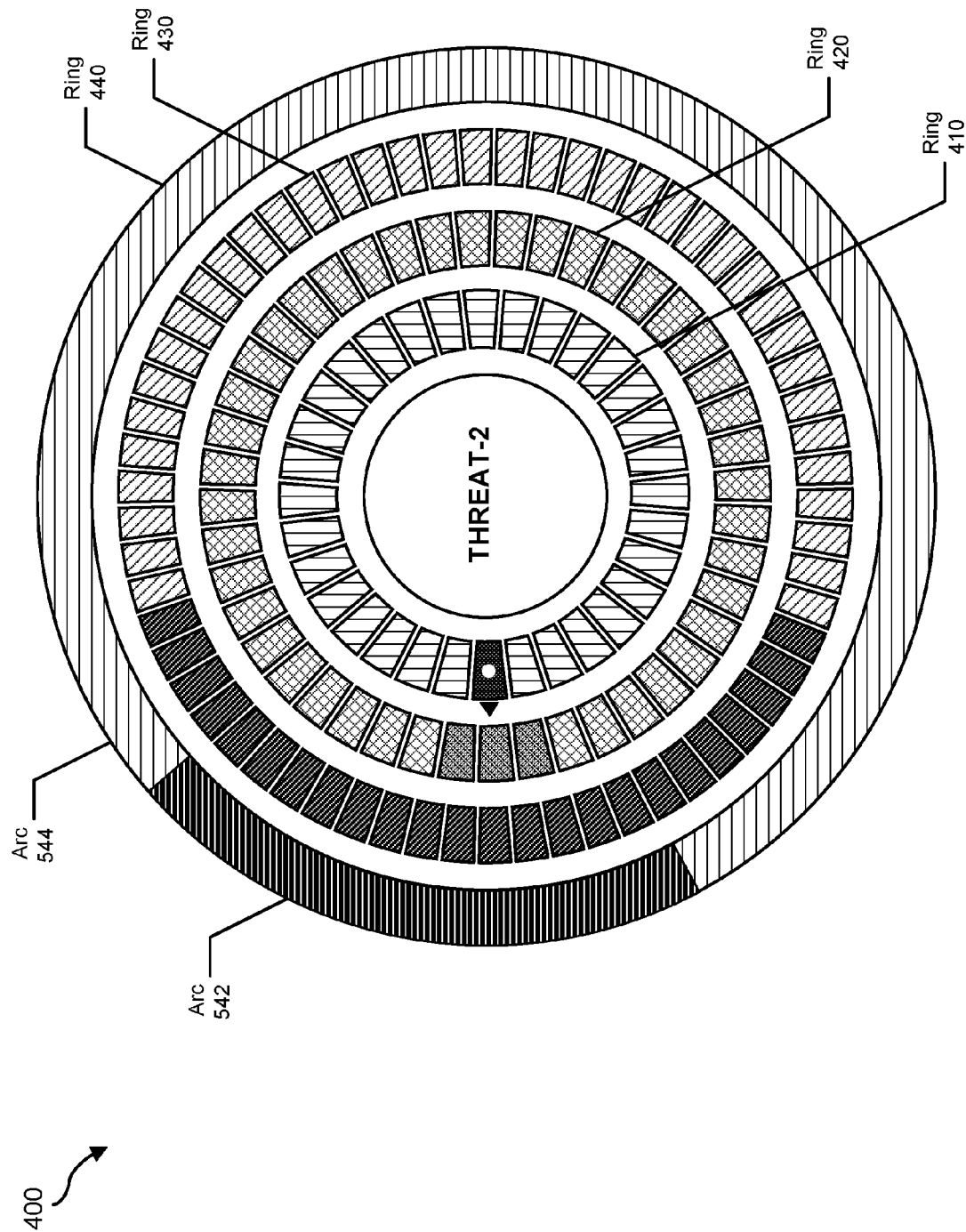
FIG. 5 is an illustration of an example graphical user interface for data visualization.

To provide another illustration of a graphical user interface for data visualization, FIG. 5 illustrates example graphical user interface 400 in different state. As shown in FIG. 5, a different threat in ring 410 (e.g., "THREAT-2") may be selected, resulting in different sets of vulnerabilities, software products, and software instances being highlighted. In addition, multiple highlighted software instances may present as a continuous arc 542 (and non-highlighted software instances may present as a continuous arc 544). Arc 542 may visually show a proportion of software instances that relate, through a chain of relationships, to the selected threat in ring 410. For example, the total number of software instances presented in graphical user interface 400 may be sufficiently large that discrete segmented arcs would be visually difficult to discern. Accordingly, responding module 108 may present continuous arcs rather than segmented arcs. For example, responding module 108 may determine that a number of data elements represented by ring 440 exceeds a predetermined threshold and therefore represent the data elements in a continuous arc rather than in segmented arcs. Additionally or alternatively, responding module 108 may identify a user configuration that specifies that ring 440 is to be presented as a continuous arc rather than segmented arcs, and/or that specifies a maximum number of data entities in ring 440 that may be presented as segmented arcs.

Figure 6:
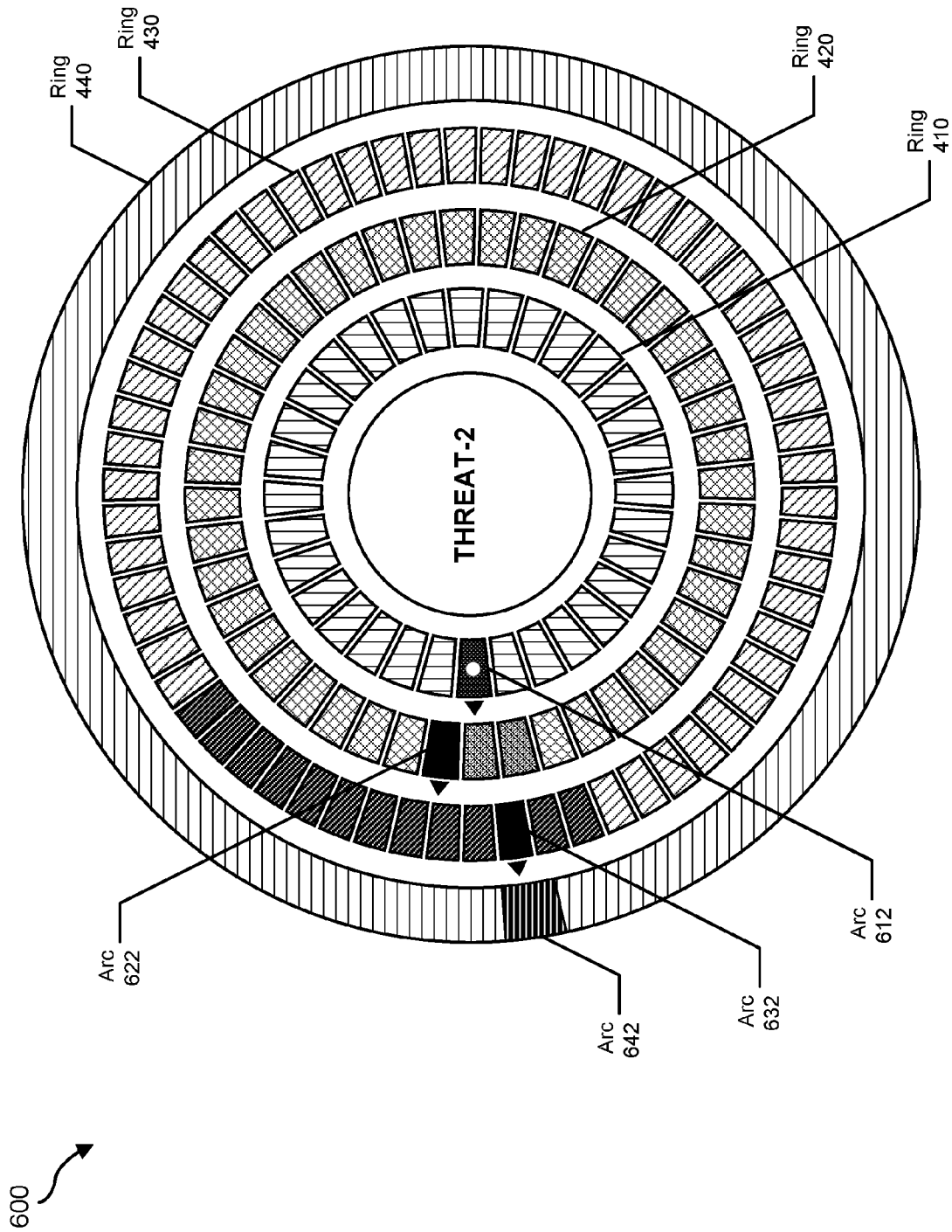
FIG. 6 is an illustration of an example graphical user interface for data visualization.

To provide another illustration of a graphical user interface for data visualization, FIG. 6 illustrates example graphical user interface 400 in a different state. As shown in FIG. 6, graphical user interface 400 may have received input selecting an arc 612 (representing "THREAT-2") as a starting point for subsequent filtering (represented, e.g., by a hollow circle in the center of arc 612). For example, graphical user interface 400 may have received a double click on arc 612 to designate arc 612 as a starting point for subsequent filtering. Graphical user interface 400 may then have received input selecting an arc 622 in ring 420 for further filtering (e.g., by receiving a single-click input on arc 622). Accordingly, responding module 108 may present as highlighted only those software products in ring 430 that are related to the selected vulnerability (e.g., arc 622) in ring 420. Likewise, graphical user interface 400 may then have received input selecting one of the highlighted arcs in ring 430 (e.g., an arc 632) for further filtering. Accordingly, responding module 108 may present arc 642 as highlighted, representing only those software instances in arc 642 that are related to the software product represented by arc 632. As shown in FIG. 6, directional indicators (e.g., pointing triangles) adjacent to each selected arc may indicate the direction of filtering (e.g., from a selection toward data entities that are highlighted based on the selection).

Figure 7:
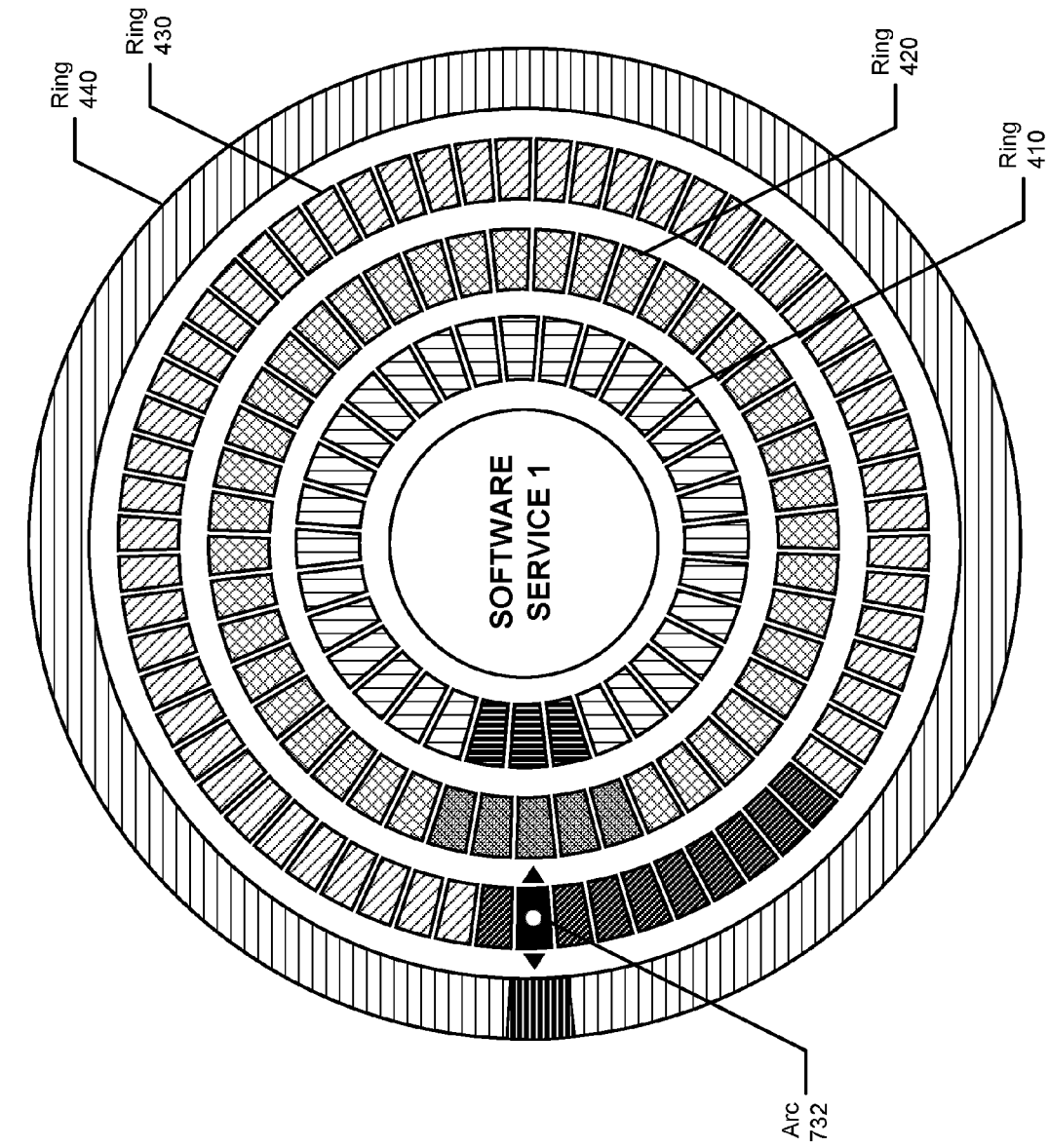
FIG. 7 is an illustration of an example graphical user interface for data visualization.

To provide another illustration of a graphical user interface for data visualization, FIG. 7 illustrates example graphical user interface 400 in a different state. As shown in FIG. 7, graphical user interface 400 may have received input selecting an arc 732 (e.g., representing "SOFTWARE SERVICE 1") as a starting point for subsequent filtering. Accordingly, responding module 108 may present both rings adjacent to ring 430 (e.g., ring 440 and ring 420) by highlighting data entities in the respective rings that are related to the data entity represented by arc 732 (e.g., "SOFTWARE SERVICE 1"). Responding module 108 may furthermore highlight data entities in ring 410 that are related to those data entities highlighted in ring 420. Thus, as shown in FIG. 6, two directional indicators on opposite sides of arc 732 may indicate two directions of filtering starting from arc 732 in ring 430 (from ring 430 to ring 440 in one direction and from ring 432 to ring 420 to ring 410 in the other direction).

Figure 8:
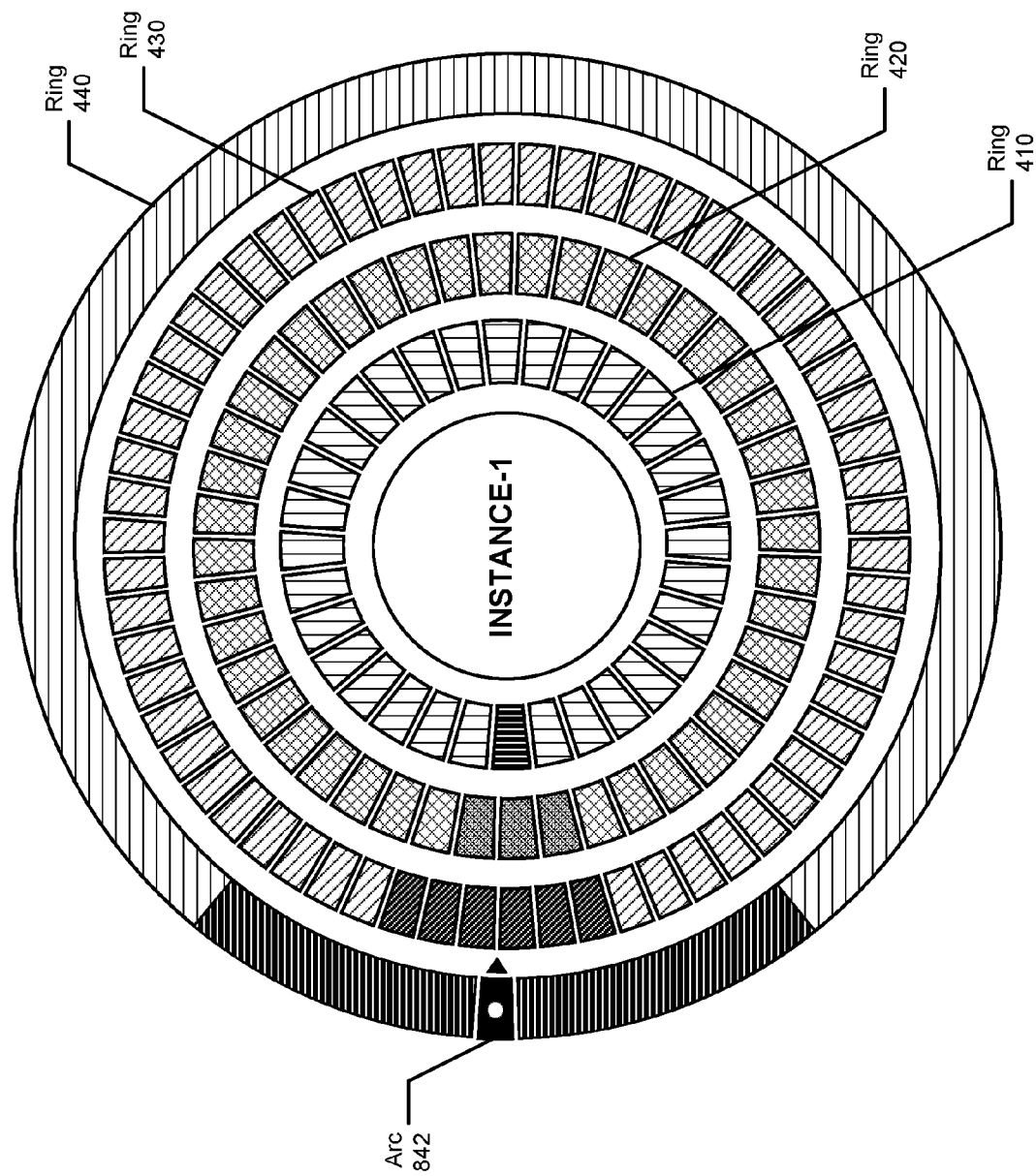
FIG. 8 is an illustration of an example graphical user interface for data visualization.

To provide another illustration of a graphical user interface for data visualization, FIG. 8 illustrates example graphical user interface 400 in a different state. As shown in FIG. 8, graphical user interface 400 may have received input selecting an arc 842 (representing "INSTANCE-1") as a starting point for subsequent filtering. Accordingly, responding module 108 may highlight arcs in ring 430 representing data entities related to "INSTANCE-1," may highlight arcs in ring 420 representing data entities related to those data entities highlighted in ring 430, and may highlight arcs in ring 410 representing data entities related to those data entities highlighted in ring 420.

In some examples, responding module 108 may restrict which data entities within the plurality of data entities are portrayed within the plurality of concentric rings based on at least one filter that excludes one or more of the plurality of data entities. For example, responding module 108 may reduce the data set based on one or more attributes of the data entities (e.g., data entities that match one or more attributes and/or data entities that fail to match one or more attributes being excluded from display). As an example, the data set may relate to cloud computing security. In this example, the graphical user interface may allow a user to select filters to apply to the data set, so that data entities may be filtered by cloud service provider (e.g., only software instances hosted by the selected cloud service provider being included), by region (e.g., only software instances hosted in the selected region being included), by availability zones (e.g., only software instances hosted in the selected availability zones being included), by severity level (e.g., only threats that meet or exceed a specified severity level being included), etc.

In some examples, responding module 108 may portray the data set according to a configuration specified by a bookmark. For example, after applying one or more filters to restrict the data set and/or after selecting one or more data entities to determine which related data entities will be highlighted in the graphical user interface, a user may, via the graphical user interface, create a bookmark reflecting the applied filters and selections. Subsequently, responding module 108 may identify that a user has loaded the bookmark and apply the same filters to the data set and selections of data entities to determine the highlighting of related data entities.

Returning to FIG. 3, at step 308, one or more of the systems described herein may receive an input within the graphical user interface to select a data entity within a selected group of the plurality of groups by selecting an arc corresponding to the selected data entity of a ring corresponding to the selected group. For example, receiving module 110 may, as part of computing device 202 in FIG. 2, receive input 250 within graphical user interface 230 to select a data entity within group 212 of groups 210 by selecting arc 244 corresponding to the selected data entity of ring 242 corresponding to the selected group 212.

Receiving module 110 may receive the input in any suitable manner. For example, receiving module 110 may receive a click or a double click on an arc representing the data entity. Additionally or alternatively, receiving module 110 may receive a textual input specifying a name of the data entity and may receive a selection of a corresponding search result. In some examples, receiving module 110 may receive an input selecting a bookmark that specifies the selection of the data entity.

Returning to FIG. 3, at step 310, one or more of the systems described herein may determine, in response to the input, that a subset of data entities within an additional group of the plurality of groups are related to the selected data entity and highlight, within the graphical user interface, the subset of data entities within an additional ring that corresponds to the additional group. For example, highlighting module 112 may, as part of computing device 202 in FIG. 2, determine, in response to input 250, that a subset of data entities within an additional group 214 of groups 210 are related to the selected data entity and highlight, within graphical user interface 230, the subset of data entities (e.g., as arcs 248) within ring 246 that corresponds to group 214.

Highlighting module 112 may highlight the subset of data entities according to any suitable criteria. For example, highlighting module 112 may determine that the subset of entities within the additional group of the plurality of groups are related to the selected entity in response to determining that the additional ring is adjacent to the ring corresponding to the selected group. For example, the systems described herein may order the groups according to a chain of relationships, the data entities of each group have potential relationships specified for the data entities of the next group in the chain of relationships. Accordingly, the rings of the graphical user interface may be arranged in the order of the chain of relationships (e.g., starting from the interior ring outward or starting from the exterior ring inward). Thus, highlighting module 112 may determine the highlighting of one ring based on the corresponding group bearing a relationship to a group represented by an adjacent ring. In some examples, highlighting module 112 may determine that the additional ring is adjacent to the ring corresponding to the selected group by determining that the additional ring is adjacent and exterior to the ring corresponding to the selected group. In some examples, highlighting module 112 may determine that the additional ring is adjacent to the ring corresponding to the selected group by determining that the additional ring is adjacent and interior to the ring corresponding to the selected group.

In some examples, highlighting module 112 may determine that a third subset of data entities within a third group of the plurality of groups are related to the subset of data entities within the additional group. In these examples, highlighting module 112 may highlight, within the graphical user interface, the third subset of data entities within a third ring that corresponds to the third group. For example, as mentioned earlier, the systems described herein may order the groups according to a chain of relationships. Accordingly, when highlighting module 112 determines, based on one or more data entities of one group, to highlight data entities of an adjacent group in the chain, highlighting module 112 may, based on the highlighted data entities, highlight related data entities in the next group in the chain (e.g., and so on until the end of the chain is reached). Furthermore, in some examples, where an initially selected data entity is within a group in the middle of the chain, highlighting module 112 may highlight data entities both up and down the chain, data entities of each group being highlighted based on those data entities that were highlighted in the previous group.

Highlighting module 112 may highlight the subset of data entities in any suitable manner. For example, highlighting module 112 may highlight the subset of data entities by applying a highlighting color (e.g., a darker and/or more saturated tone than is used to portray non-highlighted data entities) to corresponding arcs.

In some examples, the graphical user interface may enable interaction with one or more data entities represented in the graphical user interface and/or may enable one or more actions that are responsive to one or more data entities represented in the graphical user interface. For example, the systems described herein may receive an activating input within the graphical user interface relating to one or more selected data entities and perform a security action on the selected data entities in response to the activating input. For example, if one or more software instances are highlighted based on a computing threat having been selected (and, e.g., the software instances corresponding to software products that have vulnerabilities that may be exploited by the selected threat), the graphical user interface may provide and input element to (i) take the software instances offline, (ii) migrate the software instances to a secure facility, (iii) patch and/or update the underlying software product, (iv) scan the software instances for evidence of suspicious behavior and/or an effect of the threat, (v) reducing a security measure automatically placed on a software instance (e.g., based on input specifying a false positive) (vi) take a security measure with respect to the software instances and the threat.

As described above, the systems described herein may provide data visualization. An interactive model and graphical user interface for big data visualization may support investigative analysis of related entities. This model and graphical user interface may enable a user to explore threats and related entities such as vulnerabilities, software services, and assets (e.g., instances). The systems described herein may also filter the information based on service provider, regions, availability zones, and severity level. The systems described herein may also bookmark searches and later use these bookmarks as pre-filters, thereby helping users to gather insights, trends, and to investigate frequently searched information. These systems may provide a simple, easy to understand, clean, and holistic data visualization of a cloud environment. These systems may also provide real-time threat intelligence to monitor the most critical risks, direct threats, and emerging trends that could impact an organization. These systems may simplify data visualization and reduce the amount of drilling used to access granular information.

Figure 9:
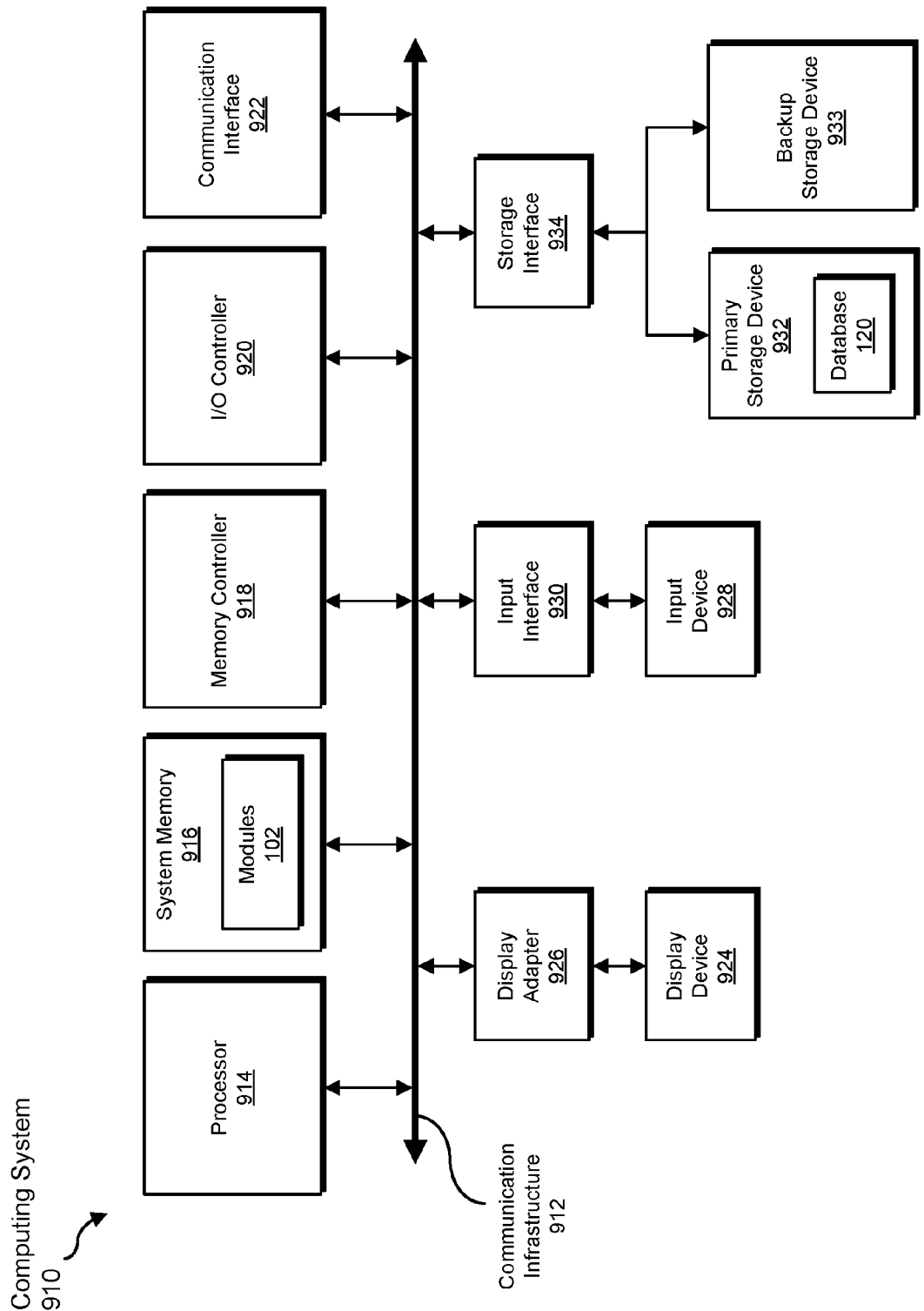
FIG. 9 is a block diagram of an example computing system capable of implementing one or more of the embodiments described and/or illustrated herein.

FIG. 9 is a block diagram of an example computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the example embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, example computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between example computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, example computing system 910 may also include at least one input device 928 coupled to communication infrastructure 912 via an input interface 930. Input device 928 generally represents any type or form of input device capable of providing input, either computer or human generated, to example computing system 910. Examples of input device 928 include, without limitation, a keyboard, a pointing device, a speech recognition device, or any other input device.

As illustrated in FIG. 9, example computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, database 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 910 may be configured as an Application Specific Integrated Circuit (ASIC) adapted to implement one or more of the example embodiments disclosed herein.

Figure 10:
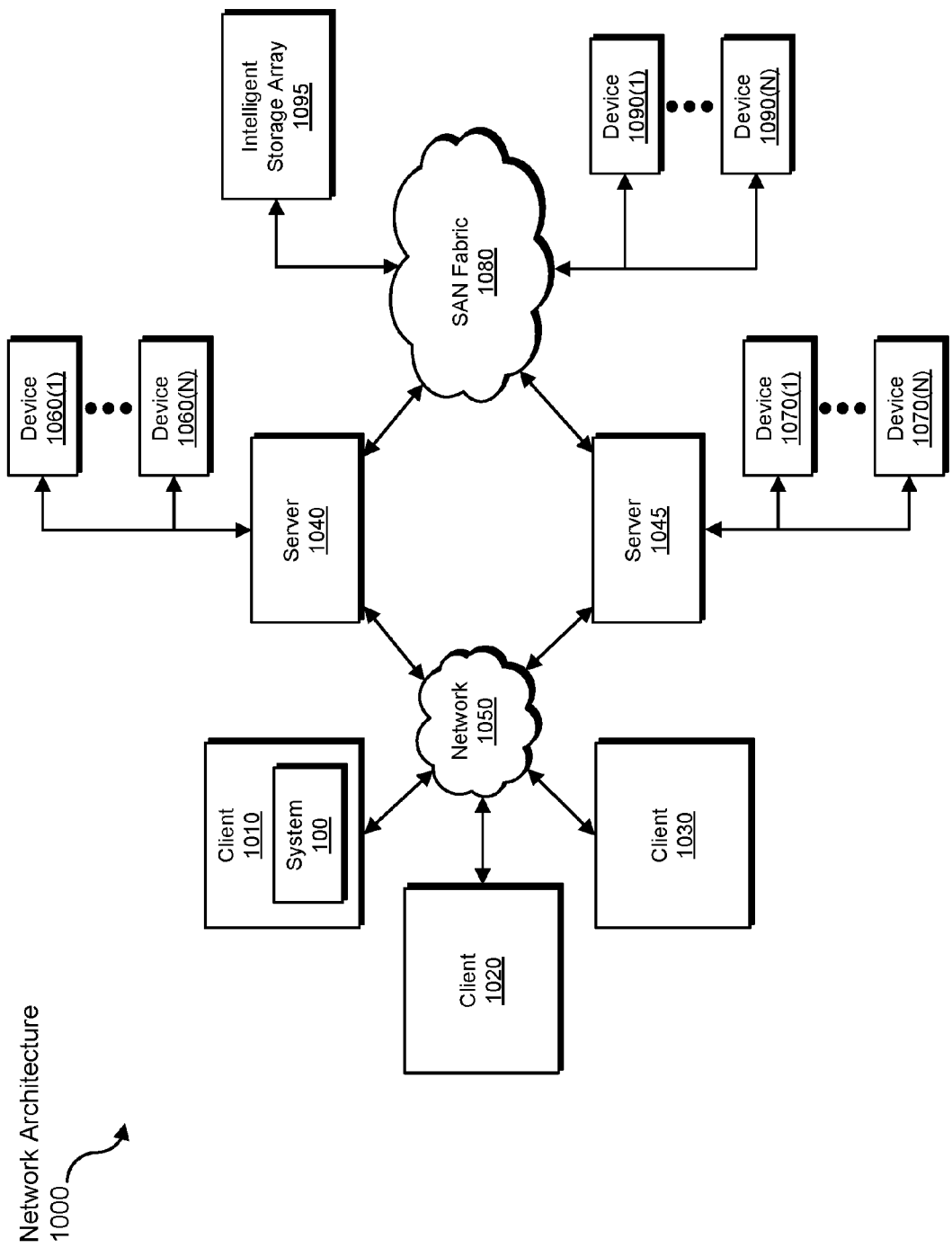
FIG. 10 is a block diagram of an example computing network capable of implementing one or more of the embodiments described and/or illustrated herein.

FIG. 10 is a block diagram of an example network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as example computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to example computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the example embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an example method for data visualization.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a data set to be transformed, transform the data set, output a result of the transformation to a display device, use the result of the transformation to receive an input instructing an action to perform relating to the data set, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for data visualization, at least a portion of the method being performed by a computing device comprising at least one processor, the method comprising:
    identifying a data set that comprises a plurality of data entities and a plurality of relationships between the data entities, wherein the data set relates to computing security and the plurality of data entities includes at least one of an identified computing security threat, a computing security vulnerability, and a software instance;
    dividing the plurality of data entities into a plurality of groups;
    responding to a request to display a representation of the data set within a graphical user interface by portraying the data set as a plurality of concentric rings, each given ring within the plurality of concentric rings portraying a corresponding group within the plurality of groups and portraying at least one data entity within the corresponding group as an arc of the given ring, wherein adjacency of rings in the plurality of concentric rings are arranged based on a chain of relationships indicating specificity of instances of computing security threats;
    receiving an input within the graphical user interface to select a data entity within a selected group of the plurality of groups by selecting an arc corresponding to the selected data entity of a ring corresponding to the selected group; and
    determining, in response to the input, that a subset of data entities within an additional group of the plurality of groups are related to the selected data entity and highlighting, within the graphical user interface, the subset of data entities within an additional ring that corresponds to the additional group.

2. The computer-implemented method of claim 1, wherein determining that the subset of entities within the additional group of the plurality of groups are related to the selected entity comprises determining that the subset of data entities are related to the selected data entity in response to determining that the additional ring is adjacent to the ring corresponding to the selected group.

3. The computer-implemented method of claim 2, wherein determining that the additional ring is adjacent to the ring corresponding to the selected group comprises at least one of:
    determining that the additional ring is adjacent and exterior to the ring corresponding to the selected group; and
    determining that the additional ring is adjacent and interior to the ring corresponding to the selected group.

4. The computer-implemented method of claim 1, further comprising:
    determining that a third subset of data entities within a third group of the plurality of groups are related to the subset of data entities within the additional group; and
    highlighting, within the graphical user interface, the third subset of data entities within a third ring that corresponds to the third group.

5. The computer-implemented method of claim 1, wherein portraying the data set as a plurality of concentric rings comprises portraying a plurality of data entities within the corresponding group as a plurality of segmented arcs of the given ring.

6. The computer-implemented method of claim 5, wherein portraying the data set as a plurality of concentric rings comprises:
    determining a number of designated data entities to represent within a designated ring of the plurality of concentric rings;
    determining that the number of designated data entities exceeds a predetermined threshold; and
    displaying the designated data entities as a solid arc of the designated ring rather than as a plurality of segmented arcs based on determining that the number of designated data entities exceeds the predetermined threshold.

7. The computer-implemented method of claim 5, wherein portraying the plurality of data entities as a plurality of segmented arcs of the given ring comprises portraying the plurality of data entities as a plurality of segmented arcs of a consistent size.

8. The computer-implemented method of claim 1, further comprising restricting which data entities within the plurality of data entities are portrayed within the plurality of concentric rings based on at least one filter that excludes one or more of the plurality of data entities.

9. The computer-implemented method of claim 1, wherein the plurality of concentric rings comprises:
 a first ring portraying a plurality of computing security threats;
 a second ring, adjacent to the first ring, portraying a plurality of computing security vulnerabilities, wherein the data set indicates which of the plurality of computing security threats exploit which of the plurality of computing security vulnerabilities;
 a third ring, adjacent to the second ring, portraying a plurality of software, wherein the data set indicates which of the plurality of computing security vulnerabilities are present in which of the plurality of software; and
 a fourth ring, adjacent to the third ring, portraying a plurality of software instances, wherein the data set indicates which of the plurality of software are instantiated by which of the plurality of software instances.

10. The computer-implemented method of claim 1, further comprising:
 receiving an activating input within the graphical user interface relating to the selected data entity; and
 performing a security action on the selected data entity in response to the activating input.

11. A system for data visualization, the system comprising:
 an identification module, stored in memory, that identifies a data set that comprises a plurality of data entities and a plurality of relationships between the data entities, wherein the data set relates to computing security and the plurality of data entities includes at least one of an identified computing security threat, a computing security vulnerability, and a software instance;
 a division module, stored in memory, that divides the plurality of data entities into a plurality of groups;
 a responding module, stored in memory, that responds to a request to display a representation of the data set within a graphical user interface by portraying the data set as a plurality of concentric rings, each given ring within the plurality of concentric rings portraying a corresponding group within the plurality of groups and portraying at least one data entity within the corresponding group as an arc of the given ring, wherein adjacency of rings in the plurality of concentric rings are arranged based on a chain of relationships indicating specificity of instance of computing security threats;
 a receiving module, stored in memory, that receives an input within the graphical user interface to select a data entity within a selected group of the plurality of groups by selecting an arc corresponding to the selected data entity of a ring corresponding to the selected group;
 a highlighting module, stored in memory, that determines, in response to the input, that a subset of data entities within an additional group of the plurality of groups are related to the selected data entity and highlights, within the graphical user interface, the subset of data entities within an additional ring that corresponds to the additional group; and
 at least one physical processor configured to execute the identification module, the division module, the responding module, the receiving module, and the highlighting module.

12. The system of claim 11, wherein the highlighting module determines that the subset of entities within the additional group of the plurality of groups are related to the selected entity by determining that the subset of data entities are related to the selected data entity in response to determining that the additional ring is adjacent to the ring corresponding to the selected group.

13. The system of claim 12, wherein the highlighting module determines that the additional ring is adjacent to the ring corresponding to the selected group by at least one of:
 determining that the additional ring is adjacent and exterior to the ring corresponding to the selected group; and
 determining that the additional ring is adjacent and interior to the ring corresponding to the selected group.

14. The system of claim 11, wherein the highlighting module further:
 determines that a third subset of data entities within a third group of the plurality of groups are related to the subset of data entities within the additional group; and
 highlights, within the graphical user interface, the third subset of data entities within a third ring that corresponds to the third group.

15. The system of claim 11, wherein the responding module portrays the data set as a plurality of concentric rings by portraying a plurality of data entities within the corresponding group as a plurality of segmented arcs of the given ring.

16. The system of claim 15, wherein the responding module portrays the data set as a plurality of concentric rings by:
 determining a number of designated data entities to represent within a designated ring of the plurality of concentric rings;
 determining that the number of designated data entities exceeds a predetermined threshold; and
 displaying the designated data entities as a solid arc of the designated ring rather than as a plurality of segmented arcs based on determining that the number of designated data entities exceeds the predetermined threshold.

17. The system of claim 15, wherein the responding module portrays the plurality of data entities as a plurality of segmented arcs of the given ring by portraying the plurality of data entities as a plurality of segmented arcs of a consistent size.

18. The system of claim 11, wherein the responding module restricts which data entities within the plurality of data entities are portrayed within the plurality of concentric rings based on at least one filter that excludes one or more of the plurality of data entities.

19. A non-transitory computer-readable medium comprising one or more computer-readable instructions that, when executed by at least one processor of a computing device, cause the computing device to:
 identify a data set that comprises a plurality of data entities and a plurality of relationships between the data entities, wherein the data set relates to computing security and the plurality of data entities includes at least one of an identified computing security threat, a computing security vulnerability, and a software instance;
 divide the plurality of data entities into a plurality of groups;

respond to a request to display a representation of the data set within a graphical user interface by portraying the data set as a plurality of concentric rings, each given ring within the plurality of concentric rings portraying a corresponding group within the plurality of groups and portraying at least one data entity within the corresponding group as an arc of the given ring, wherein adjacency of rings in the plurality of concentric rings are arranged based on a chain of relationships indicating specificity of instances of computing security threats;

receive an input within the graphical user interface to select a data entity within a selected group of the plurality of groups by selecting an arc corresponding to the selected data entity of a ring corresponding to the selected group; and determine, in response to the input, that a subset of data entities within an additional group of the plurality of groups are related to the selected data entity and highlight, within the graphical user interface, the subset of data entities within an additional ring that corresponds to the additional group.

\* \* \* \* \*